United States Patent [19]

Hara et al.

[11] Patent Number: 4,949,624
[45] Date of Patent: Aug. 21, 1990

[54] AIR CONDITIONING SYSTEM FOR USE WITH AUTOMOTIVE VEHICLE

[75] Inventors: Junichiro Hara; Hideo Takahashi, both of Yokohama City, Japan

[73] Assignee: Nissan Motor Co., Ltd., Yokohama City, Japan

[21] Appl. No.: 437,944

[22] Filed: Nov. 17, 1989

[30] Foreign Application Priority Data

Dec. 15, 1988 [JP] Japan ................................ 63-317351

[51] Int. Cl.$^5$ .............................................. B60H 1/00
[52] U.S. Cl. ..................................... 98/2.01; 165/43; 236/49.3; 236/91 C
[58] Field of Search ........................... 236/49.3, 91 C; 165/43 X; 62/186; 98/2.01

[56] References Cited

U.S. PATENT DOCUMENTS

| | | | |
|---|---|---|---|
| 4,417,618 | 11/1983 | Yoshimi et al. | 236/49.3 X |
| 4,434,932 | 3/1984 | Hara et al. | 236/49.3 |
| 4,875,624 | 10/1989 | Hara et al. | 165/43 X |

FOREIGN PATENT DOCUMENTS

| | | |
|---|---|---|
| 5628419 | 8/1954 | Japan . |
| 56-160213 | 9/1981 | Japan . |
| 62-47727 | 2/1987 | Japan . |

*Primary Examiner*—William E. Wayner
*Attorney, Agent, or Firm*—Pennie & Edmonds

[57] ABSTRACT

An air conditioning system for use with an automotive vehicle is disclosed. The air conditioning system includes a duct through which tempered air is directed into a compartment for passengers. A control device is associated with the duct for operating in a first mode discharging the tempered air in the form of concentrated currents toward the respective passengers, in a second mode discharging the tempered air in the form of diffused currents toward the respective passengers, and in a third mode changing the first and second modes at variable time intervals. One of the first, second and third modes is selected according to sensed values of compartment temperature and insolation intensity. The ratio of a first time period during which the first mode is continued in the third mode to a second time period during which the second mode is continued in the third mode is increased with increasing insolation intensity.

13 Claims, 11 Drawing Sheets

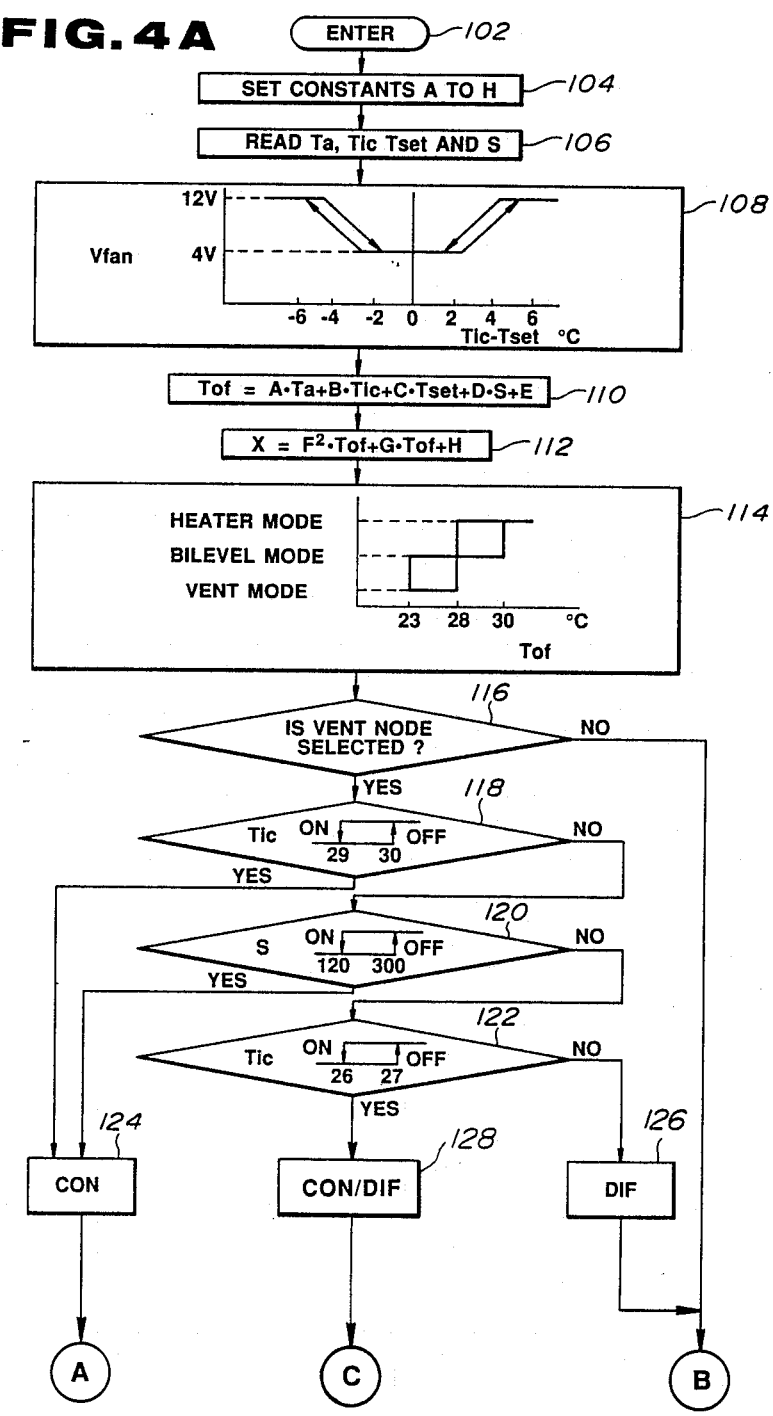

4,949,624

AIR CONDITIONING SYSTEM FOR USE WITH AUTOMOTIVE VEHICLE

BACKGROUND OF THE INVENTION

This invention relates to an air conditioning system for use with an automotive vehicle including a duct through which tempered air is directed into a vehicle passenger compartment.

Automotive air conditioning systems have sometimes utilized an air cooling heat exchanger, formed by an evaporator, and an air heating heat exchanger, heated by engine coolant, for reheating the chilled air. These heat exchangers are disposed in series in a duct having a movable air directing valve disposed therein for directing a variable proportion of the chilled air across the heater to control the final temperature of tempered air introduced into the passenger compartment.

It has been proposed, for example, in Japanese Utility Model Kokai No. 56-28419 and Japanese Patent Kokai Nos. 56-160213 and 62-47727, to provide an improved impression on the passengers by introducing the tempered air in the form of continuous currents toward the passengers when a great difference exists between the sensed and desired values of compartment temperature and in the form of intermittent currents toward the passengers when the sensed compartment temperature comes closer to the desired value. However, such a proposal has proven insufficient to meet their bodily sensations. This is stemmed from the fact that these mode changes are made without regard to the isolation intensity on which the effective temperature is dependent greatly.

SUMMARY OF THE INVENTION

Therefore, it is a main object of the invention to provide an improved air conditioning system which can produce tempered air currents in a manner to provide more comfortable sensations to the passengers.

There is provided, in accordance with the invention, an air conditioning system for use with an automotive vehicle including a duct through which tempered air is directed into a compartment for passengers. The system comprises a control device associated with the duct for operating in a first mode discharging the tempered air in the form of concentrated currents toward the respective passengers, in a second mode discharging the tempered air in the form of diffused currents toward the respective passengers, and in a third mode changing the first and second modes alternatively to continue the first mode for a first period of time and the second mode for a second period of time. The system also comprises means sensitive to a temperature in the passenger compartment for producing a first sensor signal indicative of a sensed value of compartment temperature, means sensitive to an insolation intensity for producing a second sensor signal indicative of a sensed value of insolation intensity, and a control unit responsive to the first and second sensor signals for operating the control device in one of the first, second and third modes. The control unit includes means for increasing a ratio of the first time period to the second time period with increasing insolation intensity during the third mode.

In another aspect of the invention, there is provided air conditioning system for use with an automotive vehicle including a duct through which tempered air is directed into a compartment for passengers. The system comprises a control device associated with the duct for discharging the tempered air toward the respective passengers, the control device being operable in a first mode discharging the tempered air in the form of currents concentrated in a maximum degree, in a second mode discharging the tempered air in the form of currents diffused in a maximum degree, and in a third mode changing fourth and fifth modes alternatively. The control device discharges the tempered air in the form of currents concentrated in a first degree during the fourth mode and in the form of currents diffused in a second degree during the fifth mode. The system also comprises means sensitive to a temperature in the passenger compartment for producing a first sensor signal indicative of a sensed value of compartment temperature, means sensitive to an insolation intensity for producing a second sensor signal indicative of a sensed value of insolation intensity, and a control unit responsive to the first and second sensor signals for operating the control device in one of the first, second and third modes. The control unit includes means for increasing the first degree while decreasing the second degree with increasing insolation intensity during the third mode.

In still another aspect of the invention, there is provided an air conditioning system for use with an automotive vehicle including a duct through which tempered air is directed into a compartment for passengers. The system comprises a control device associated with the duct for discharging the tempered air toward the respective passengers. The control device is operable in a first mode discharging the tempered air in the form of currents concentrated in a maximum degree, in a second mode discharging the tempered air in the form of currents diffused in a maximum degree, and in a third mode changing fourth and fifth modes alternatively. The control device discharges the tempered air in the form of currents concentrated in a first degree during the fourth mode and in the form of currents diffused in a second degree during the fifth mode. The system also comprises means sensitive to a temperature in the passenger compartment for producing a first sensor signal indicative of a sensed value of compartment temperature, means sensitive to an insolation intensity for producing a second sensor signal indicative of a sensed value of insolation intensity, means for manually setting a desired strength of the currents discharged toward the respective passengers to produce a setting signal indicative of a desired current strength set therefor, and a control unit responsive to the first and second sensor signals for operating the control device in one of the first, second and third modes. The control unit includes means responsive to the setting signal for increasing the first degree while decreasing the second degree with increasing desired current strength during the third mode.

BRIEF DESCRIPTION OF THE DRAWINGS

This invention will be described in greater detail by reference to the following description taken in connection with the accompanying drawings, in which:

FIGS. 4A and 4B are flow diagrams of the programming of the digital computer used in the air conditioning system;

DETAILED DESCRIPTION OF THE INVENTION

Figure 1:
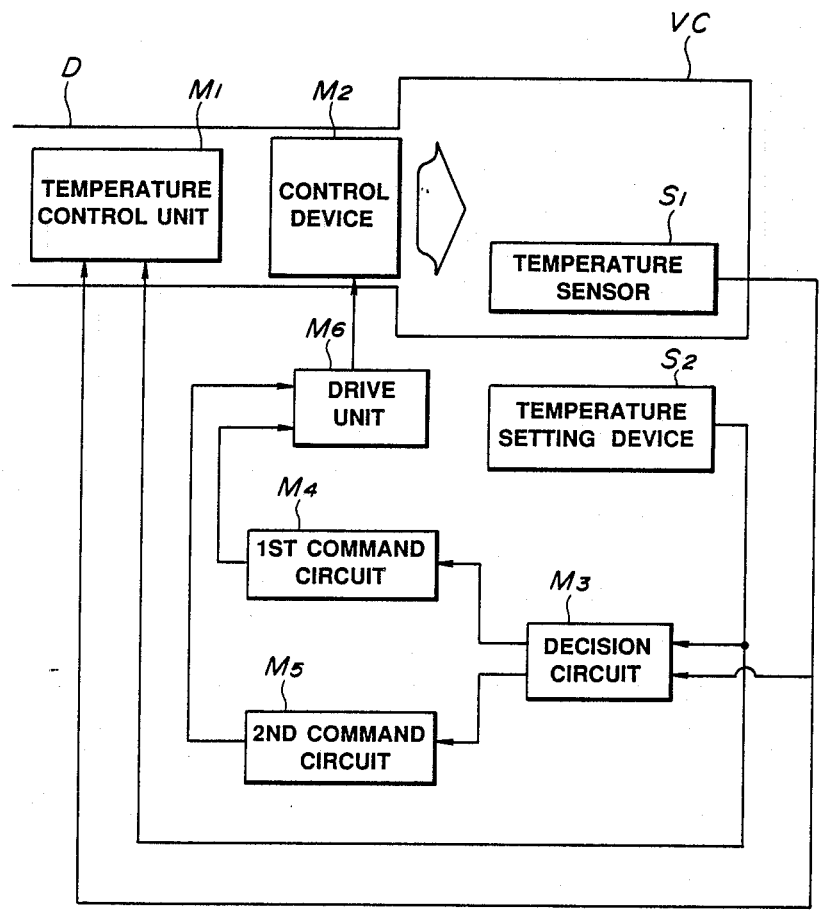
FIG. 1 is a schematic block diagram showing a conventional air conditioning system.

Prior to the description of the preferred embodiment of the present invention, the prior art air conditioning system of FIG. 1 is briefly described in order to specifically point out the difficulties attendant thereon.

FIG. 1 shows a conventional air conditioning system disclosed in Japanese Patent Publication No. 62-47727. The conventional system includes a duct D through which air is directed into the passenger compartment VC, an air temperature control unit M1, and a control device M2. A sensor S1 is provided at a position suitable for sensing the temperature in the passenger compartment VC. The sensor S1 produces a sensor signal indicative of a sensed compartment temperature to a decision circuit M3 and also to the temperature control unit M1. A setting device S2 is provided at a position convenience for the passenger to set a desired temperature in the passenger compartment. The setting device S2 produces a setting signal indicative of a desired value for passenger compartment temperature to the decision circuit M3 and also to the temperature control unit M1. The control unit M1 calculates a difference between the sensed and desired values of passenger compartment temperature and controls the final temperature of the tempered air entering the passenger compartment according to the calculated difference.

The decision circuit M3 calculates a difference between the sensed and desired values of passenger compartment temperature and produces a first control signal when the calculated difference is less than a predetermined value and a second control signal when the calculated difference exceeds the predetermined value. The first control signal is applied from the decision circuit M3 to a first command circuit M4 which thereby produces a first command signal causing a drive unit M6 to operate the control device M2 in a first mode producing continuous currents of tempered air toward the passengers seated on the vehicle front seats so as to provide a comfortable feel to the passengers. The second control signal is applied from the decision circuit M3 to a second command circuit M5 which thereby produces a second command signal causing the drive unit M6 to operate the control device M2 in a second mode producing intermittent currents of tempered air toward the passengers seated on the vehicle front seats so as to avoid an uncomfortable feel with cold.

With the conventional air conditioning system, the tempered air is introduced in the form of continuous currents directed to the passengers when the difference between the sensed and desired values of compartment temperature is greater than the predetermined value. In the presence of some degrees of insolation, the continuous tempered air currents will provide a comfortable sensation to the passengers. When the insolation is week, however, the passengers will feel uncomfortable with cold. This is stemmed from the fact that the human perspiration is greatly dependent on the influence of the existing insolation intensity.

It is known from the publication entitled "Thermophysiology", published 1981 by Rikogakusha Co. that the average radiation temperature Tr (°C.), which is substantially the same as the human effective temperature taking into account the influence of the existing radiant heat, is given as:

$$Tr = Tg + 2.37\sqrt{v}(Tg - Ta)$$

where Tg is the temperature (°C.) measured by a globe thermometer having a thermometer placed in a black-painted copper globe of a 15 cm diameter for taking into account the influence of the existing radiant heat, Ta is the environmental temperature (°C.) measured by a dry bulb thermometer under a condition unaffected by the influence of the existing aerial current, and v is the velocity (m/s) of the wind. Therefore, it may be considered to provide a comfortable sensation to the passengers by controlling the air conditioning system according to the average radiation temperature Tr.

It was found through our experiments that the average radiation temperature Tr is higher 3° to 5° C. than the environmental temperature Ta on summer days. It means that the conventional air conditioning system is controlled according to the environmental temperature Ta 3° to 5° C. higher than the average radiation temperature Tr on summer days. As a result, the passengers will feel uncomfortable with cold particularly when the insolation is week.

Figure 2:
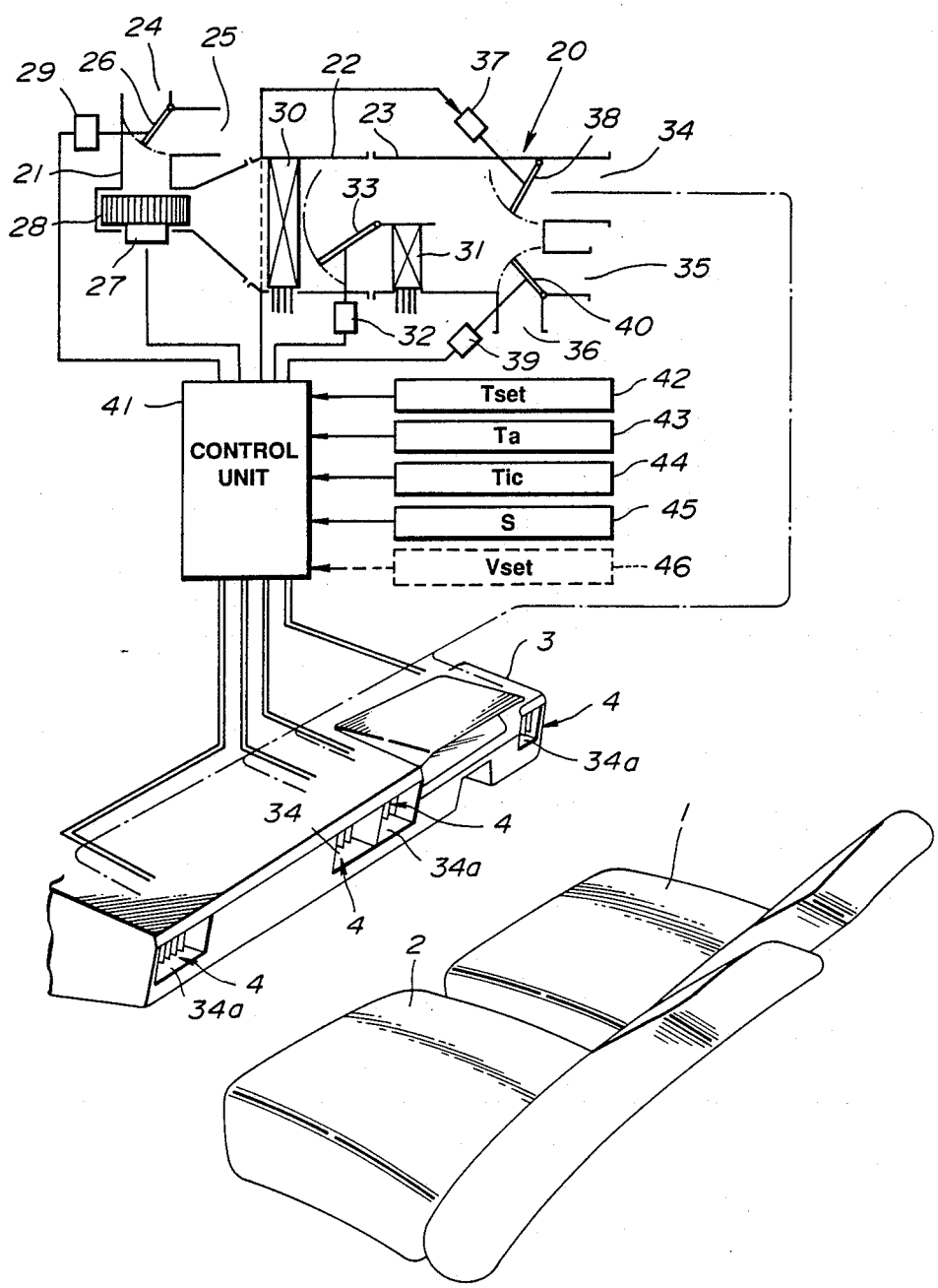
FIG. 2 is a schematic illustration of an air conditioning system made in accordance with the invention.

Referring to FIG. 2, there is illustrated an air conditioning system embodying the invention. The air conditioning system is intended for use with an automotive vehicle having a liquid cooled internal combustion engine. A series connection of first, second and third ducts 21, 22 and 23 constitutes an air duct through which air is directed into the passenger compartment. The first duct 21 has a first inlet port 26 opening to the atmosphere and a second inlet port 25 opening to the passenger compartment. An air intake valve 26 is provided for movement between two positions. At the first position, the air intake valve 26 closes the first inlet port 24 and opens the second inlet port 25. When the air intake valve 26 is at the second position, it opens the first inlet port 24 and closes the second inlet port 25. An air intake valve actuator 29 is operated on command from a control unit 41 to move the air intake valve 26 between the first and second positions. The first duct 21 contains a blower unit which includes a blower 28 and a blower motor 27. The blower motor 27 is operated on command from the control unit 41 for driving the blower 28 so as to produce a forced flow of air through the air duct.

The air conditioning system also includes an air chilling heat exchanger in the form of an evaporator 30 disposed in the second duct 22, and an air heating heat exchanger in the form of a heater core 31 disposed in the third duct 23. Air flowing through the air duct is chilled by the evaporator 30 after which the air may be reheated to a desired degree as it passes through the heater core 31 which carries a controlled amount of engine coolant from the engine cooling system. An air mixing valve 33 is provided on the upstream side of the heater core 31 for controlling the air flow to the heater core 31. The air mixing valve 33 is adjustably movable to proportion the chilled air across the heater core 31 to control the final temperature of of the air entering the passenger compartment. An air mixing valve actuator 32 is operated on command from the control unit 41 to move the air mixing valve 33 at a desired angle.

The third duct 23 has a ventilator port 34, a defroster port 35, and a lower port 36. The ventilator port 34 is connected to a plurality of exit openings 34a formed in the vehicle instrument panel. These exit openings 34a face to the passengers (not shown) seated on the front seats 1 and 2. A louver window 4 is provided for each of the exit openings 34a. The defroster port 35 opens to defog the vehicle windshield in the presence of a specified condition. The lower port 36 opens into the passenger compartment to direct the tempered air along the floor of the compartment. A vent valve 38 is provided for movement between two positions. At the first position, the vent valve 38 closes the ventilator port 34. When the vent valve 38 is at the second position, it opens the ventilator port 34. A vent valve actuator 37 is operated on command from the control unit 41 to move the vent valve 38 between the first and second positions. A change-over valve 40 is provided for movement between two positions. At the first position, the change-over valve 40 closes the defroster port 35 and opens the lower port 36. When the change-over valve 40 is at the second position, it opens the defroster port 35 and closes the lower port 36. A change-over valve actuator 39 is operated on command from the control unit 41 to move the change-over valve 40 between the first and second positions.

Figure 3A:
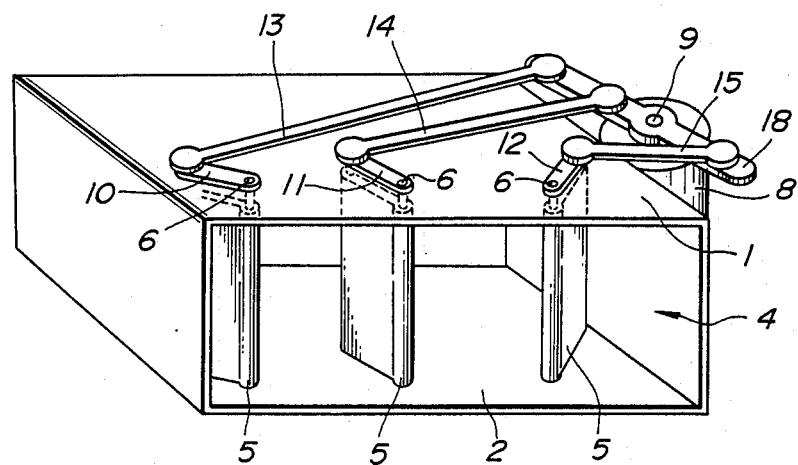
FIG. 3A is an enlarged perspective view showing the control device used in the air conditioning system of FIG. 2.
Figure 3B:
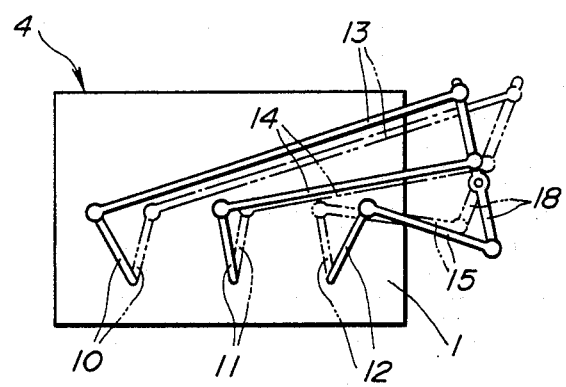
FIG. 3B is a plan view of the control device of FIG. 3A.

Referring to FIG. 3, the louver window 4 has a plurality of (in the illustrated case three) swingable louver members 5 each having a shaft 6 fixedly secured to one side thereof and supported by the upper and lower walls 1 and 2 of the louver window 4 for rotation in unison with the corresponding louver member 5. These shafts 6 are coupled through a link mechanism to a drive motor 8 having an output shaft 9. The link mechanism is shown as including short arms 10, 11 and 12, long arms 13, 14 and 15 of different lengths, and a lever 18. The short arms 10, 11 and 12 are fixedly secured at their one ends to the respective shafts 6 and pivoted at the other ends thereof to one ends of the respective long arms 13, 14 and 15. The other ends of the long arms 13, 14 and 15 are pivoted on the lever 18 fixedly secured intermediate its ends on the output shaft 9 of the drive motor 8. When the air conditioning system is required to operate in a concentration mode discharging the tempered air in the form of concentrated currents toward the respective passengers, the drive motor 8 is operated on command from the control unit 41 to place the louver members 5 at a first position, indicated by the solid lines of FIG. 3B, concentrating the tempered air at the passengers seated on the front seats 1 and 2. When the air conditioning system is required to operate in a diffusion mode discharging the tempered air in the form of diffused currents toward the respective passengers, the drive motor 8 is operated on command from the control unit 41 to place the louver members 5 at a second position, indicated by the phantom lines of FIG. 3B, diffusing the tempered air in the passenger compartment.

It is to be appreciated that the manner in which the tempered air discharging mode is switched is not limited in any way to the illustrated case. For example, one of the exit openings 34a through which the tempered air is discharged toward the corresponding passenger may be closed when the air conditioning system is required to operate in a diffused mode.

The control unit 41 controls the air conditioning system by controlling the drive motor 8, the blower motor 27, the air intake valve actuator 29, the air mixing valve actuator 32, the vent valve actuator 37 and the change-over valve actuator 39 based upon various conditions that are sensed during the operation of the air conditioning system. These sensed conditions include ambient temperature, compartment temperature, and insolation intensity. Thus, an ambient temperature sensor 42, a compartment temperature sensor 43, and an insolation intensity sensor 44 are connected to the control unit 41. The ambient temperature sensor 42 is sensitive to ambient temperature and it produces an ambient temperature signal indicative of a sensed ambient temperature Ta. The compartment temperature sensor 43 is sensitive to compartment temperature and it produces a compartment temperature signal indicative of a sensed compartment temperature Tic. The insolation intentisy sensor 44 is sensitive to insolation intensity and it produces an insolation intensity signal indicative of a sensed insolation intensity S. A compartment temperature setting device 45 is also connected to the control unit 41. The setting device 45 is mounted on the vehicle instrument panel at a convenient position for the passenger to set a desired value Tset for compartment temperature. For the second and third embodiments of the invention, a discharged current strength setting device 46 is connected to the control unit 41. The setting device 46 is mounted on the vehicle instrument panel at a convenient position for the passenger to manually set a desired value Vt for the strength of the tempered air currents discharged into the passenger compartment.

The control unit 41 may employ a digital computer which shall be regarded as including an analog-to-digital converter, a central processing unit, a memory, a digital-to-analog converter, and output control circuits. The analog-to-digital converter receives the analog signals from the sensors 42, 43 and 44 and also from the compartment temperature setting device 45 and it converts the received signals into corresponding digital signals for application to the central processing unit. The memory contains the program for operating the central processing unit and further contains appropriate data in look-up tables used in calculating appropriate values for blower motor driving voltage. Control words specifying desired motor driving voltage and desired air mixing valve position are periodically transferred by the central processing unit to the digital-to-analog converter. The digital-to-analog converter converts the transferred information into analog form and it applies a blower motor driving voltage for controlling the blower motor 27 and a control signal to the air mixing valve actuator 32 for controlling the degree of opening of the air mixing valve 33. The control circuits produce various commands, determined by the central processing unit based on the sensed conditions, for controlling the drive motor 8 and the valve actuators 29, 37 and 39.

Figure 4B:
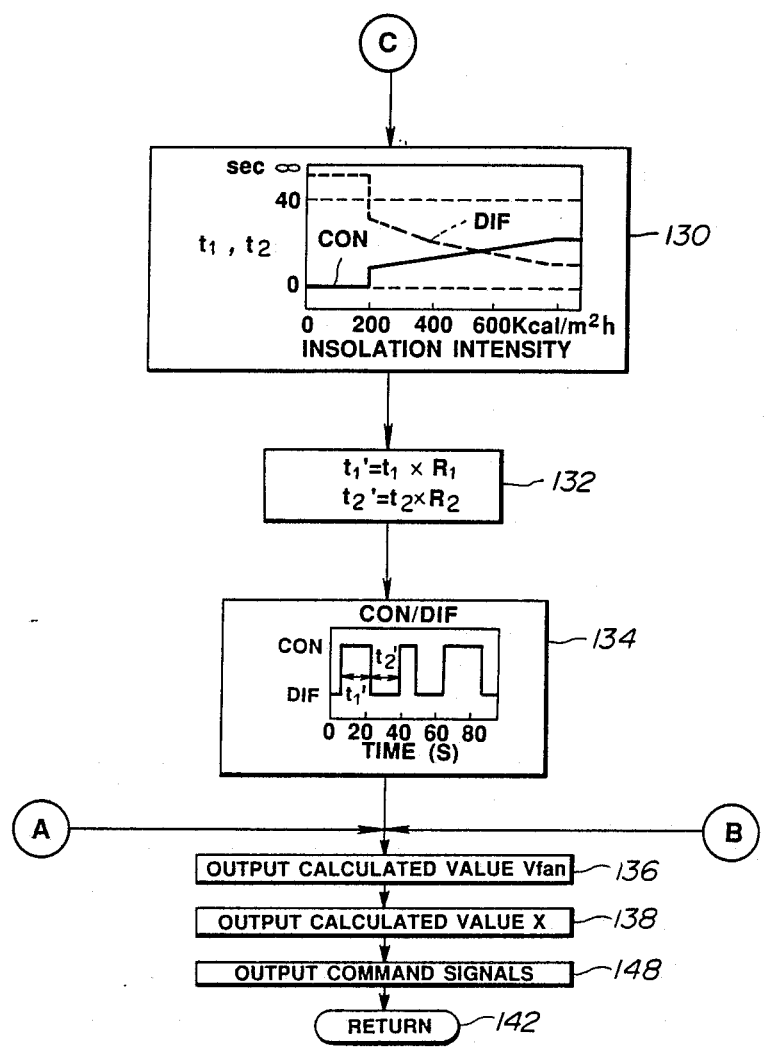

FIG. 4 is a flow diagram of the programming of the digital computer used in the control unit 41 for controlling the air conditioning system. The computer program is entered at the point 102 when the air conditioning system is powered. At the point 104 in the program, the central processing unit sets various constants A to H for use in calculating a required value Tof for tempered air temperatuer and a required value X for air mixing valve position. Following this, the ambient temperature signal, the compartment temperature signal, the insolation intensity signal, and the compartment temperature setting signal are, one by one, converted by the analog-to-digital converter into digital form and read into the computer memory at the point 108.

At the point 108 in the program, the central processing unit calculates a required value Vfan for blower motor driving voltage from a relationship programmed into the computer. This relationship, shown in the block 108, defines blower motor driving voltage as a function of a difference (Tic−Tset) where Tic is the read compartment temperature value, and Test is the read compartment temperature setting value.

At the point 110 in the program, the central processing unit calculates a required value Tof for tempered air temperature from the following equation:

$$Tof = A \cdot Ta + B \cdot Tic + C \cdot Tset + D \cdot S + E$$

where Ta is the read ambient temperature value, Tic is the read compartment temperature value, Tset is the read compartment temperature setting value, S is the read insolation intensity value, and A, B, C, D and E are the constants set at the point 104. At the point 112 in the program, the central processing unit calculates a required value X for air mixing door position from the following equation:

$$X = F^2 \cdot Tof + G \cdot Tof + H$$

where Tof is the calculated tempered air temperature value, and F, G and H are the constants set at the point 104.

At the point 114 in the program, the central processing unit selects one of "heater", "bilevel" and "vent" modes. This selection is made based on the calculated value Tof of tempered air temperature, as shown in the block 114. At the point 116 in the program, a determination is made as to whether or not the "vent" mode is selected. If the answer to this question is "yes", then the program proceeds to the point 118. Otherwise, the program proceeds to the point 136.

At the point 118 in the program, a determination is made as to whether or not the compartment temperature exceeds a first reference value. For this determination, the central processing unit may compare the read compartment temperature value Tic hysteretically with a lower reference level (for example, 29° C.) when the compartment temperature is decreasing and with a higher reference level (for example, 30° C.) when the compartment temperature is increasing. This is effective to eliminate the tendency toward hunting. If the answer to this question is "yes", then it means that the read compartment temperature value Tic is greater than the lower reference level when the compartment temperature is decreasing or the read compartment temperature value Tic is greater than the higher reference level when the compartment temperature is increasing and the program proceeds to the point 124. Otherwise, the program proceeds to another determination step at the point 120. This determination is as to whether or not the insolation intensity S exceeds a second reference level. For this determination, the central processing unit may compare the read insolation intensity value S hysteretically with a lower reference level (for example, 120 kcal/m²h) when the insolation intensity is decreasing and with a higher reference level (for example, 300 kcal/m²h) when the insolation intensity is increasing. This is effective to eliminate the tendency toward hunting. If the answer to this question is "yes", then it means that the read insolation intensity value S is greater than the lower reference level when the insolation intensity is decreasing or the read insolation intensity value S is greater than the higher reference level when the insolation intensity is increasing and the program proceeds to the point 124. Otherwise, the program proceeds to another determination step at the point 122. This determination is as to whether or not the compartment temperature Tic exceeds a third reference level less than the first reference level. For this determination, the central processing unit may compare the read compartment temperature value Tic hysteretically with a lower reference level (for example, 26° C.) when the compartment temperature is decreasing and with a higher reference level (for example, 27° C.) when the compartment temperature is decreasing. This is effective to eliminate the tendency toward hunting. If the answer to this question is "yes", then it means that the read compartment temperature value Tic is greater than the lower reference level when the compartment temperature is decreasing or the read compartment temperature value Tic is greater than the higher reference level when the compartment temperature is increasing and the program proceeds to the points 128. Otherwise, the program proceeds to the point 126.

At the point 124 in the program, the central processing unit selects the "concentration" mode and produces a command signal to operate the drive motor 8 so as to place the louver members 5 at the first position discharging the tempered air in the form of concentrated current toward the respective passengers. Following this, the program proceeds to the point 136.

At the point 126 in the program, the central processing unit selects the "diffusion" mode and produces a command signal to operate the drive motor 8 so as to place the louver members 5 at the second position discharging the tempered air in the form of diffused currents toward the respective passengers. Following this, the program proceeds to the point 136.

At the point 128 in the program, the central processing unit selects the "concentration/diffusion" mode where the "concentration" and "diffusion" modes are changed alternatively. Following this, the program proceeds to the point 130.

The central processing unit selects one of the "concentration", "diffusion" and "concentration/diffusion" modes from the results of the determination steps at the points 118, 120 and 122. This mode selection is made as shown in Table 1 where the mark 0 indicates that the corresponding condition is fulfilled and the mark X indicates that the corresponding condition is not fulfilled.

TABLE 1

| Case No. | Tic > 29 | Tic > 26 | S > 120 | Mode |
|---|---|---|---|---|
| 1 | O | O | O | CON |
| 2 | O | O | X | CON |
| 3 | X | O | O | CON |
| 4 | X | O | X | DIF |
| 5 | X | X | O | CON/DIF |
| 6 | X | X | X | DIF |

As can be seen from a study of Table 1, different modes are selected depending on the insolation intensity at the same compartment temperature. For example, although the conditions related to the compartment temperature Tic are the same for Cases Nos. 3 and 4, the central processing unit selects the "concentration" mode for Case No. 3 where the insolation intensity S is greater than 120 kcal/m²h and the "diffusion" mode for Case No. 4 where the insolation intensity S is smaller than 120 kcal/m²h. In other words, the mode selection depends on not only the compartment temperature but also the insolation intensity. It is, therefore, possible to produce tempered air currents in the passenger compartment in a manner to meet the bodily sensation of the passengers. It is to be appreciated that the step at the point 122 may be removed. In this case, the program proceeds from the point 120 directly to the point 128 if the answer to the question inputted at the point 120 is "yes". Otherwise, the program proceeds from the point 120 to the point 126.

At the point 130 in the program, the central processing unit calculates an appropriate value t1 for the period of time during which the "concentration" mode is to be continued in the "concentration/diffusion" mode and an appropriate value t2 during which the "diffusion" mode is to be continued in the "concentration/diffusion" mode. The time period t1 increases as the insolation intensity S increases, as indicated by the solid curve of the graph shown in the block 130, whereas the time period t2 decreases as the insolation intensity S increases, as indicated by the broken curve of the graph shown in the block 130. It is to be noted that the "diffusion" mode is continued without changing to the "concentration" mode when the insolation intensity S is less than a predetermined value, for example, 200 kcal/m²h.

At the point 132 in the program, the central processing unit calculates a modified time period value t1' by multiplying the calculated value t1 by a first random number R1 selected at random from a number of random numbers and a modified time period value t2' by multiplying the calculated value t2 by a second random number R2 selected at random from the random numbers. The random numbers ranges from 0.5 to 1.5. This is effective to change the "concentration" and "diffusion" modes alternatively in a manner to produce rhythmical tempered air currents similar to natural wind currents.

At the point 134 in the program, the central processing unit produces a command signal to operate the drive motor 8 in a manner change the "concentration" and "diffusion" modes alternatively in such a manner to continue the "concentration" mode for the modified time period t1' and the "diffusion" mode for the modified time period t2', as shown in the block 134.

Although both of the time period t1 during which the "concentration" mode is to be continued and the time period t2 during which the "diffusion" mode is to be continued are calculated at the point 130, it is to be appreciated that only one of the time periods t1 and t2 may be calculated with the other time period being set at a constant value as long as the ratio of the time period t1 to the time period t2 increases as the insolation intensity S increases.

At the point 136 in the program, the calculated blower motor driving voltage value Vfan is transferred to the digital-to-analog converter. The digital-to-analog converter converts the transferred information into analog form and applies a blower motor driving voltage for controlling the blower motor 27 according to the calculated value for it. At the point 138 in the program, the calculated air mixing valve position value X is transferred to the digital-to-analog converter. The digital-to-analog converter converts the transferred information into analog form and applies a control signal to the air mixing valve actuator 32 which thereby makes a change in the position of the air mixing valve 33 if this is required.

At the point 140 in the program, the central processing unit causes the control circuits to produce command signals to the valve actuators 37 and 39, causing the vent and change-over valves 38 and 40 to open the defroster port 35 and the lower port 36 when the "heater" mode has been selected at the point 114, or to open the ventilator port 34 and the lower port 36 when the "bilevel" mode has been selected at the point 114, or to open the ventilator port 34 when the "vent" mode has been selected at the point 114.

Following this, the program proceeds to the point 142 where the computer program returns to the point 106 to start the next cycle of execution of the computer program.

Figure 5A:
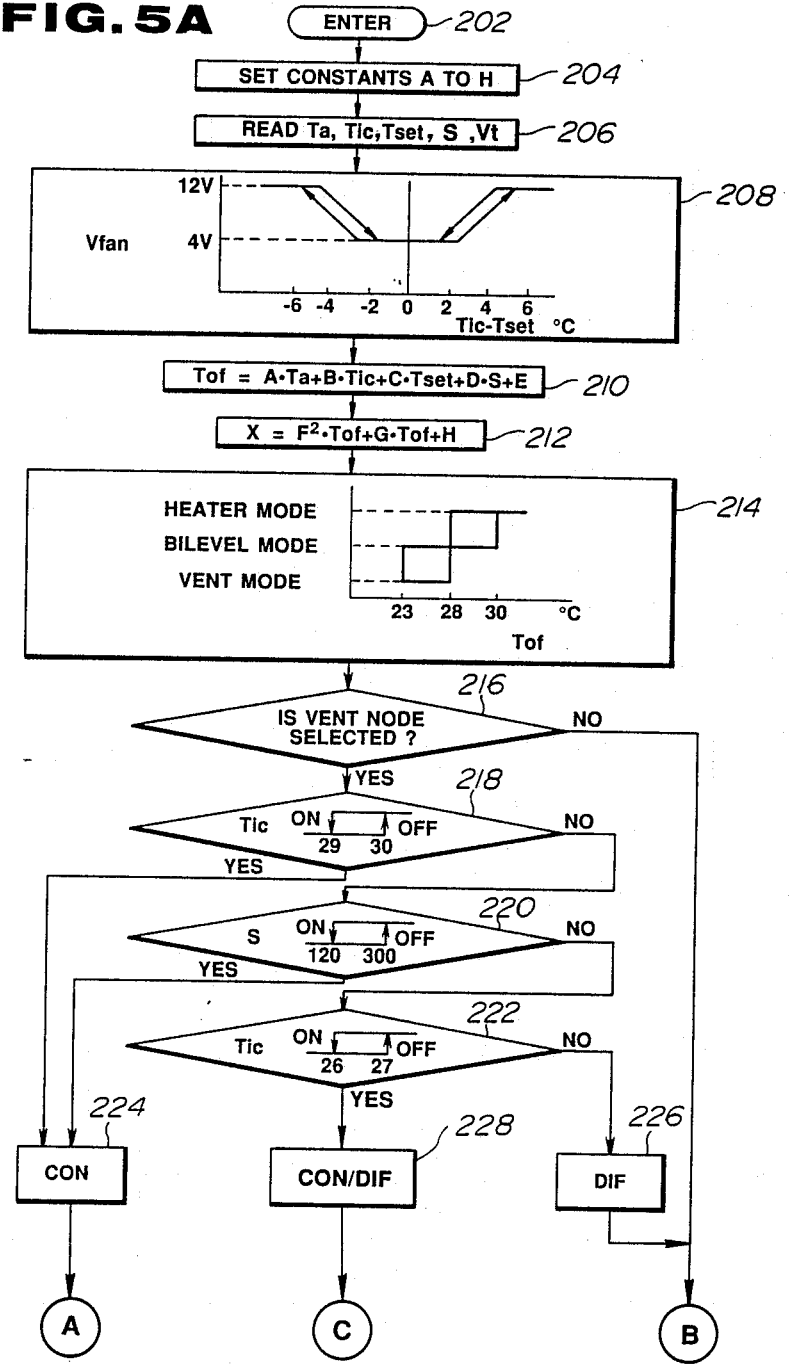
FIGS. 5A and 5B are flow diagrams of a modified form of the programming of the digital computer used in the air conditioning system.
Figure 5B:
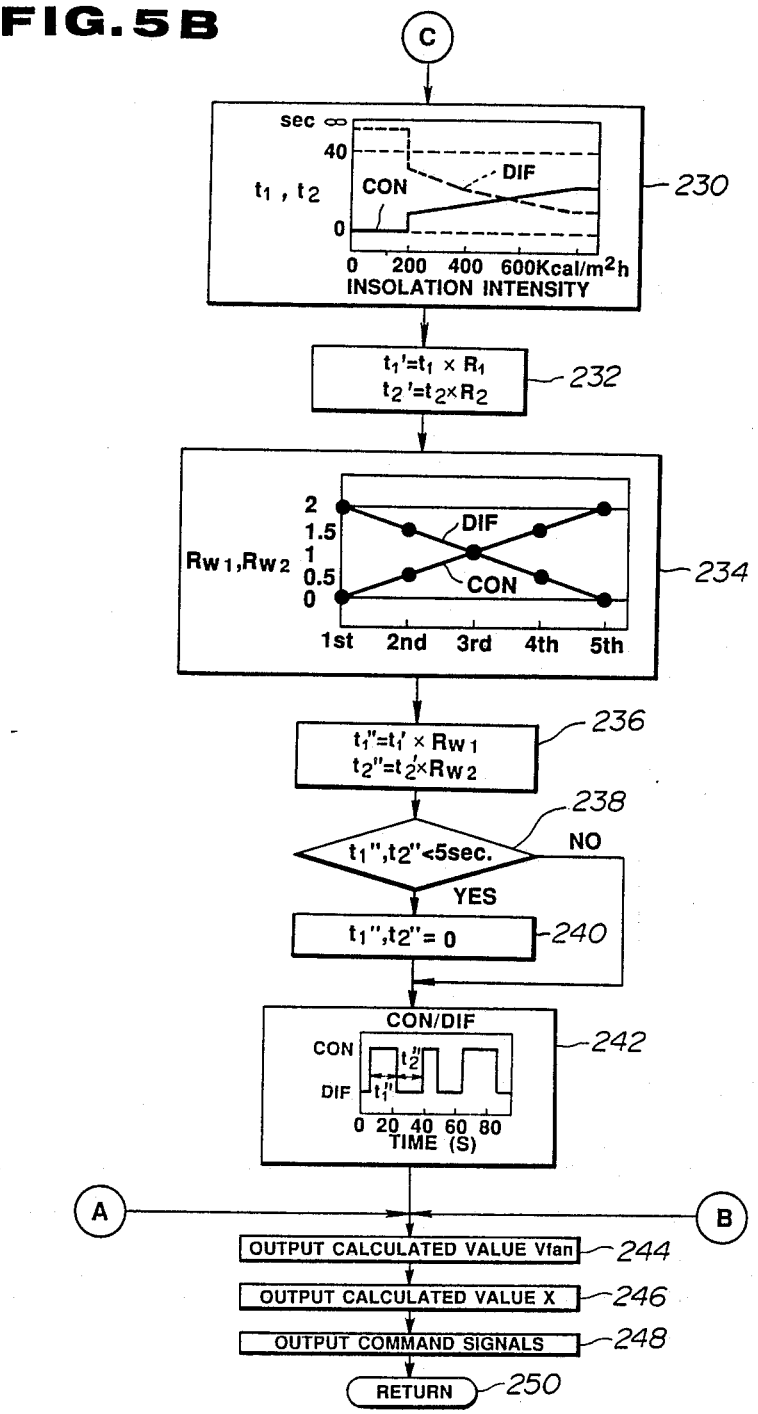

FIG. 5 is a flow diagram of the programming of the digital computer used in a second embodiment of the control unit 41 for controlling the air conditioning system. The computer program is entered at the point 202 when the air conditioning system is powered. At the point 204 in the program, the central processing unit sets various constants A to H for use in calculating a required value Tof for tempered air temperature and a required value X for air mixing valve position. Following this, the program proceeds to the point 206 where the ambient temperature signal, the compartment temperature signal, the insolation intensity signal, and the compartment temperature setting signal are, one by one, converted by the analog-to-digital converter into digital form and read into the computer memory. In addition, the desired current strength value Vt set by means of the discharged current strength setting device 46 is read into the computer memory. The setting device 46 may have first, second, third, fourth and fifth positions. A greater discharged current strength value Vt is set when the passenger selects a position having a higher ordinal number.

At the point 208 in the program, the central processing unit calculates a required value Vfan for blower motor driving voltage from a relationship programed into the computer. This relationship, shown in the block 108, defines blower motor driving voltage as a function of a difference (Tic−Tset) where Tic is the read compartment temperature value, and Test is the read compartment temperature setting value.

At the point 210 in the program, the central processing unit calculates a required value Tof for tempered air temperature from the following equation:

$$Tof = A \cdot Ta + B \cdot Tic + C \cdot Tset + D \cdot S + E$$

where Ta is the read ambient temperature value, Tic is the read compartment temperature value, Tset is the read compartment temperature setting value, S is the read insolation intensity value, and A, B, C, D and E are the constants set at the point 204. At the point 212 in the program, the central processing unit calculates a required value X for air mixing door position from the following equation:

$$X = F^2 \cdot Tof + G \cdot Tof + H$$

where Tof is the calculated tempered air temperature value, and F, G and H are the constants set at the point 204.

At the point 214 in the program, the central processing unit selects one of "heater", "bilevel" and "vent" modes. This selection is made based on the calculated value Tof of tempered air temperature, as shown in the block 214. At the point 216 in the program, a determination is made as to whether or not the "vent" mode is selected. If the answer to this question is "yes", then the program proceeds to the point 218. Otherwise, the program proceeds to the point 244.

At the point 218 in the program, a determination is made as to whether or not the compartment temperature exceeds a first reference value. For this determination, the central processing unit may compare the read compartment temperature value Tic hysteretically with a lower reference level (for example, 29° C.) when the compartment temperature is decreasing and with a higher reference level (for example, 30° C.) when the compartment temperature is increasing. This is effective to eliminate the tendency toward hunting. If the answer to this question is "yes", then it means that the read compartment temperature value Tic is greater than the lower reference level when the compartment temperature is decreasing or the read compartment temperature value Tic is greater than the higher reference level when the compartment temperature is increasing and the program proceeds to the point 224. Otherwise, the program proceeds to another determination step at the point 220. This determination is as to whether or not the insolation intensity S exceeds a second reference level. For this determination, the central processing unit may compare the read isolation intensity value S hysteretically with a lower reference level (for example, 120 kcal/m$^2$h) when the insolation intensity is decreasing and with a higher reference level (for example, 300 kcal/m$^2$h) when the insolation intensity is increasing. This is effective to eliminate the tendency toward hunting. If the answer to this question is "yes", then it means that the read insolation intensity value S is greater than the lower reference level when the insolation intensity is decreasing or the read insolation intensity value S is greater than the higher reference level when the insolation intensity is increasing and the program proceeds to the point 224. Otherwise, the program proceeds to another determination step at the point 222. This determination is as to whether or not the compartment temperature Tic exceeds a third reference level less than the first reference level. For this determination, the central processing unit may compare the read compartment temperature value Tic hysteretically with a lower reference level (for example, 26° C.) when the compartment temperature is decreasing and with a higher reference level (for example, 27° C.) when the compartment temperature is decreasing. This is effective to eliminate the tendency toward hunting. If the answer to this question is "yes", then it means that the read compartment temperature value Tic is greater than the lower reference level when the compartment temperature is decreasing or the read compartment temperature value Tic is greater than the higher reference level when the compartment temperature is increasing and the program proceeds to the point 228. Otherwise, the program proceeds to the point 226.

At the point 224 in the program, the central processing unit selects the "concentration" mode and produces a command signal to operate the drive motor 8 so as to place the louver members 5 at the first position discharging the tempered air in the form of concentrated current toward the respective passengers. Following this, the program proceeds to the point 244.

At the point 226 in the program, the central processing unit selects the "diffusion" mode and produces a command signal to operate the drive motor 8 so as to place the louver members 5 at the second position discharging the tempered air in the form of diffused currents toward the respective passengers. Following this, the program proceeds to the point 244.

At the point 228 in the program, the central processing unit selects the "concentration/diffusion" mode where the "concentration" and "diffusion" modes are changed alternatively. Following this, the program proceeds to the point 230.

At the point 230 in the program, the central processing unit calculates an appropriate value t1 for the period of time during which the "concentration" mode is to be continued in the "concentration/diffusion" mode and an appropriate value t2 during which the "diffusion" mode is to be continued in the "concentration/diffusion" mode. The time period t1 increases as the insolation intensity S increases, as indicated by the solid curve of the graph shown in the block 230, whereas the time period t2 decreases as the insolation intensity S increases, as indicated by the broken curve of the graph shown in the block 230. It is to be noted that the "diffusion" mode is continued with no change to the "concentration" mode when the insolation intensity S is less than a predetermined value, for example, 200 kcal/m$^2$h.

At the point 232 in the program, the calculated time period values t1 and t2 are modified to provide modified time period values t1' and t2' by multiplying the calculated values t1 and t2 by respective random numbers R1 and R2 selected at random from a number of random numbers ranging from 0.5 to 1.5. This is effective to change the "concentration" and "diffusion" modes alternatively in a manner to produce rhythmical tempered air currents similar to natural wind currents.

At the point 234 in the program, the central processing unit calculates correction factors Rw1 and Rw2 from the relasionships as shown in the block 234. These relationships define the respective correction factors Rw1 and Rw2 as a function of the desired current strength value Vt set by means of the discharged current strength setting device 46. The correction factor Rw1 is used to correct the modified time period t1' and it increases as the desired current strength value Vt increases; that is, the passenger selects a position having a higher ordinal number. The correction factor Rw2 is used in correcting the modified time period t2 and it decreases as the desired current strength value Vt increases; that is, the passenger selects a position having a higher ordinal number. For example, the correction factors Rw1 and Rw2 range from 0 to 2.

At the point 236 in the program, the central processing unit corrects the modified time period t1' by multiplying the modified time period t1 by the correction factor Rw1 and corrects the modified time period t2' by multiplying the modified time period t2 by the correction factor Rw2.

At the point 238 in the program, a determination is made as to whether or not the corrected value t1" or t2" is equal to or less than a predetermined value, for example, five seconds. If the answer to this question is "yes", then the program proceeds to the point 240 where the time period t1" or t2" is reduced to zero and then to the point 242. This is effective to avoid frequent mode changes. Otherwise, the program proceeds from the point 238 directly to the point 242.

At the point 242 in the program, the central processing unit produces a command signal to operate the drive motor 8 to change the "concentration" and "diffusion" modes alternatively in such a manner as to continue the "concentration" mode for the corrected time period t1″0 and the "diffusion" mode for the corrected time period t2″, as shown in the block 242.

Although both of the time period t1 during which the "concentration" mode is to be continued and the time period t2 during which the "diffusion" mode is to be continued are calculated at the point 230, it is to be appreciated that only one of the time periods t1 and t2 may be calculated with the other time period being set at a constant value as long as the ratio of the time period t1 to the time period t2 increases as the insolation intensity S increases.

At the point 244 in the program, the calculated blower motor driving voltage value Vfan is transferred to the digital-to-analog converter. The digital-to-analog converter converts the transferred information into analog form and applies a blower motor driving voltage for controlling the blower motor 27 according to the calculated value for it. At the point 246 in the program, the calculated air mixing valve position value X is transferred to the digital-to-analog converter. The digital-to-analog converter converts the transferred information into analog form and applies a control signal to the air mixing valve actuator 32 which thereby makes a change in the position of the air mixing valve 33 if this is required.

At the point 248 in the program, the central processing unit causes the control circuits to produce command signals to the valve actuators 37 and 39, causing the vent and change-over valves 38 and 40 to open the defroster port 35 and the lower port 36 when the "heater" mode has been selected at the point 214, or to open the ventilator port 34 and the lower port 36 when the "bilevel" mode has been selected at the point 214, or to open the ventilator port 34 when the "vent" mode has been selected at the point 214.

Following this, the program proceeds to the point 250 where the computer program returns to the point 106 to start the next cycle of execution of the computer program.

Figure 6A:
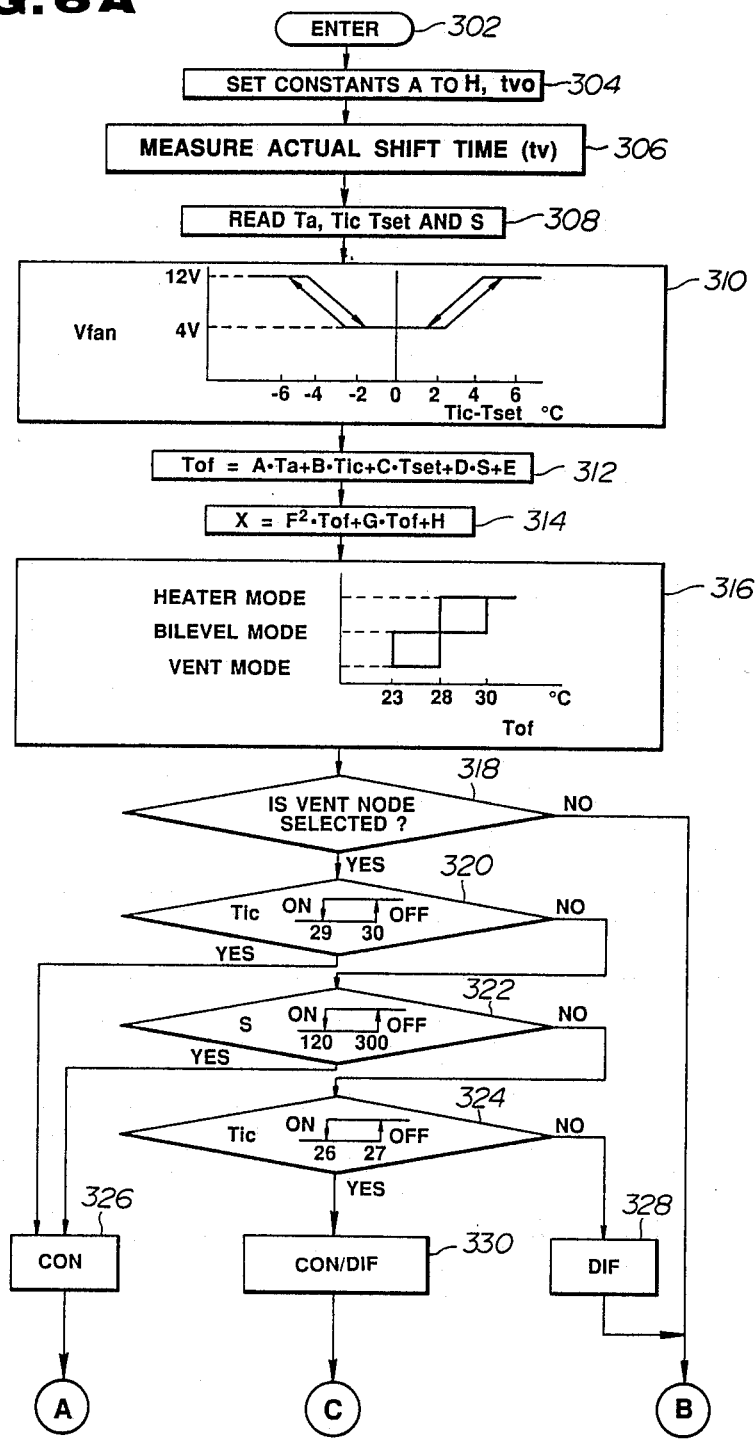
FIGS. 6A and 6B are flow diagrams of another modified form of the programming of the digital computer used in the air conditioning system.
Figure 6B:
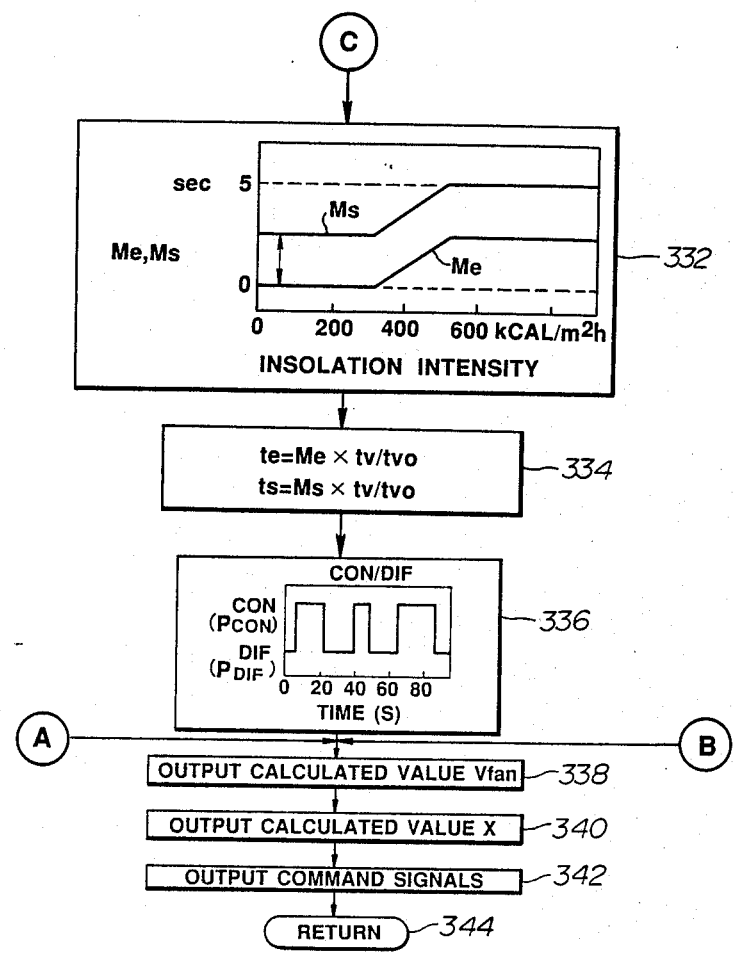

FIGS. 6A and 6B are flow diagrams of the programming of the digital computer used in a third embodiment of the control unit 41 for controlling the air conditioning system. The computer program is entered at the point 302 when the air conditioning system is powered. At the point 304 in the program, the central processing unit sets various constants A to H for use in calculating a required value Tof for tempered air temperatuer and a required value X for air mixing valve position. In addition, the central processing unit sets a reference time period tvo, for example, five seconds, required for the drive motor 8 to move the louver members 5 between the first position concentrating the tempered air discharged into the passenger compartment and the second position diffusing the tempered air dishcarged into the passenger compartment. At the point 306 in the program, an actual time period tv it takes the drive motor 8 to move the louver members 5 between the first and second positions is measured. This measurement is made by monitoring drops in the current to the drive motor 8. Following this, the program proceeds to the point 308 where the ambient temperature signal, the compartment temperature signal, the insolation intensity signal, and the compartment temperature setting signal are, one by one, converted by the analog-to-digital converter into digital form and read into the computer memory.

At the point 310 in the program, the central processing unit calculates a required value Vfan for blower motor driving voltage from a relationship programed into the computer. This relationship, shown in the block 310, defines blower motor driving voltage as a function of a difference (Tic−Tset) where Tic is the read compartment temperature value, and Test is the read compartment temperature setting value.

At the point 312 in the program, the central processing unit calculates a required value Tof for tempered air temperature from the following equation:

$$Tof = A \cdot Ta + B \cdot Tic + C \cdot Tset + D \cdot S + E$$

where Ta is the read ambient temperature value, Tic is the read compartment temperature value, Tset is the read compartment temperature setting value, S is the read insolation intensity value, and A, B, C, D and E are the constants set at the point 304. At the point 314 in the program, the central processing unit calculates a required value X for air mixing door position from the following equation:

$$X = F^2 \cdot Tof + G \cdot Tof + H$$

where Tof is the calculated tempered air temperature value, and F, G and H are the constants set at the point 304.

At the point 316 in the program, the central processing unit selects one of "heater", "bilevel" and "vent" modes. This selection is made based on the calculated value Tof of tempered air temperature, as shown in the block 316. At the point 318 in the program, a determination is made as to whether or not the "vent" mode is selected. If the answer to this question is "yes", then the program proceeds to the point 320. Otherwise, the program proceeds to the point 338.

At the point 320 in the program, a determination is made as to whether or not the compartment temperature exceeds a first reference value. For this determination, the central processing unit may compare the read compartment temperature value Tic hysteretically with a lower reference level (for example, 29° C.) when the compartment temperature is decreasing and with a higher reference level (for example, 30° C.) when the compartment temperature is increasing. This is effective to eliminate the tendency toward hunting. If the answer to this question is "yes", then it means that the read compartment temperature value Tic is greater than the lower reference level when the compartment temperature is decreasing or the read compartment temperature value Tic is greater than the higher reference level when the compartment temperature is increasing and the program proceeds to the point 326. Otherwise, the program proceeds to another determination step at the point 322. This determination is as to whether or not the insolation intensity S exceeds a second reference level. For this determination, the central processing unit may compare the read insolation intensity value S hysteretically with a lower reference level (for example, 120 kcal/m²h) when the insolation intensity is decreasing and with a higher reference level (for example, 300 kcal/m²h) when the insolation intensity is increasing. This is effective to eliminate the tendency toward hunting. If the answer to this question is "yes", then it means that the read insolation intensity value S is greater than the lower reference level when the insolation intensity is decreasing or the read insolation intensity value S is greater than the higher reference level when the insolation intensity is increasing and the program proceeds to the point 326. Otherwise, the program proceeds to another determination step at the point 324. This determination is as to whether or not the compartment temperature Tic exceeds a third reference level less than the first reference level. For this determination, the central processing unit may compare the read compartment temperature value Tic hysteretically with a lower reference level (for example, 26° C.) when the compartment temperature is decreasing and with a higher reference level (for example, 27° C.) when the compartment temperature is decreasing. This is effective to eliminate the tendency toward hunting. If the answer to this question is "yes", then it means that the read compartment temperature value Tic is greater than the lower reference level when the compartment temperature is decreasing or the read compartment temperature value Tic is greater than the higher reference level when the compartment temperature is increasing and the program proceeds to the points 330. Otherwise, the program proceeds to the point 328.

At the point 326 in the program, the central processing unit selects the "concentration" mode and produces a command signal to operate the drive motor 8 so as to place the louver members 5 at the first position discharging the tempered air in the form of concentrated current toward the respective passengers. Following this, the program proceeds to the point 338.

At the point 328 in the program, the central processing unit selects the "diffusion" mode and produces a command signal to operate the drive motor 8 so as to place the louver members 5 at the second position discharging the tempered air in the form of diffused currents toward the respective passengers. Following this, the program proceeds to the point 338.

At the point 330 in the program, the central processing unit selects the "concentration/diffusion" mode where the "concentration" and "diffusion" modes are changed alternatively. Following this, the program proceeds to the point 332.

At the point 332 in the program, the central processing unit calculates a diffusing position ($P_{DIF}$) in the form of time Me it takes the drive motor 8 to bring the louver members 5 to the diffusing position from the second position at which the air conditioning system operates in the "diffusion" mode and also a concentrating position ($P_{CON}$) in the form of time Ms it takes the drive motor 8 to bring the louver members 5 to the concentrating position from the second position. These calculations are made from relationships defining these times Me and Ms as a function of insolation intensity S, as shown in the block 332. Assuming now that the reference time tvo is 5 seconds, the time Me may be set at zero seconds when the insolation intensity is equal to or less than 300 kcal/m² and at 2.5 seconds when the insolation intensity is equal to or greater than 500 kcal/m², whereas the time Ms may be set at 2.5 seconds when the insolation intensity is equal to or less than 300 kcal/m² and at 5 seconds when the insolation intensity is equal to or greater than 500 kcal/m². Therefore, the degree of concentration of the tempered air discharged into the passenger compartment increases as the insolation intensity increases or the degree of diffusion of the tempered air discharged into the passenger compartment decreases as the insolation intensity increases.

At the point 334 in the program, the central processing unit corrects the calculated times Me and Ms to obtain corrected times te and ts by multiplying the calculated times Me and Ms by a ratio tv/tvo where the tv is the time measured at the point 306 and tvo is the reference time set at the point 304. The corrected time te is the actual time required for the drive motor 8 to bring the louver members 5 from the second position to the diffusing position and the corrected time ts is the actual time required for the drive motor 8 to bring the louver members 5 from the second position to the concentrating position.

At the point 336 in the program, the central processing unit produces a command signal to operate the driver motor 8 to change the "concentration" and "diffusion" modes alternatively. In this case, the drive motor 8 is operated to hold the louver members 5 at the concentrating ($P_{CON}$) position during the "concentration" mode and to hold the louver member 5 at the diffusing position ($P_{DIF}$) during the "diffusing" mode.

At the point 338 in the program, the calculated blower motor driving voltage value Vfan is transferred to the digital-to-analog converter. The digital-to-analog converter converts the transferred information into analog form and applies a blower motor driving voltage for controlling the blower motor 27 according to the calculated value for it. At the point 340 in the program, the calculated air mixing value position value X is transferred to the digital-to-analog converter. The digital-to-analog converter converts the transferred information into analog form and applies a control signal to the air mixing value actuator 32 which thereby makes a change in the position of the air mixing valve 33 if this is required.

At the point 342 in the program, the central processing unit causes the control circuits to produce command signals to the valve actuators 37 and 39, causing the vent and change-over valves 38 and 40 to open the defroster port 35 and the lower port 36 when the "heater" mode has been selected at the point 316, or to open the ventilator port 34 and the lower port 36 when the "bilevel" mode has been selected at the point 316, or to open the ventilator port 34 when the "vent" mode has been selected at the point 316.

Following this, the program proceeds to the point 344 where the computer program returns to the point 308 to start the next cycle of execution of the computer program.

Figure 7A:
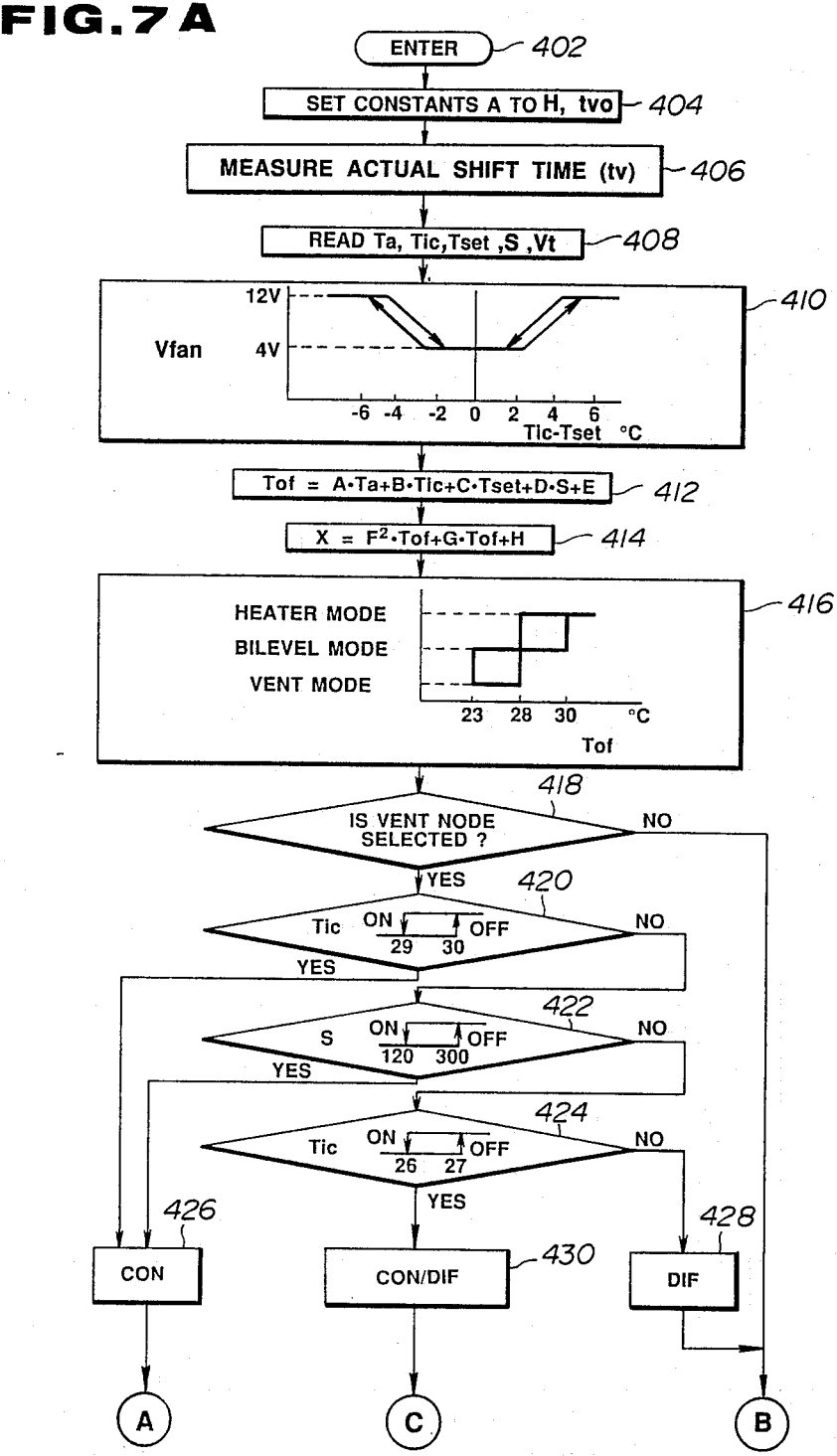
FIGS. 7A and 7B are flow diagrams of still another modified form of the programming of the digital computer used in the air conditioning system.
Figure 7B:
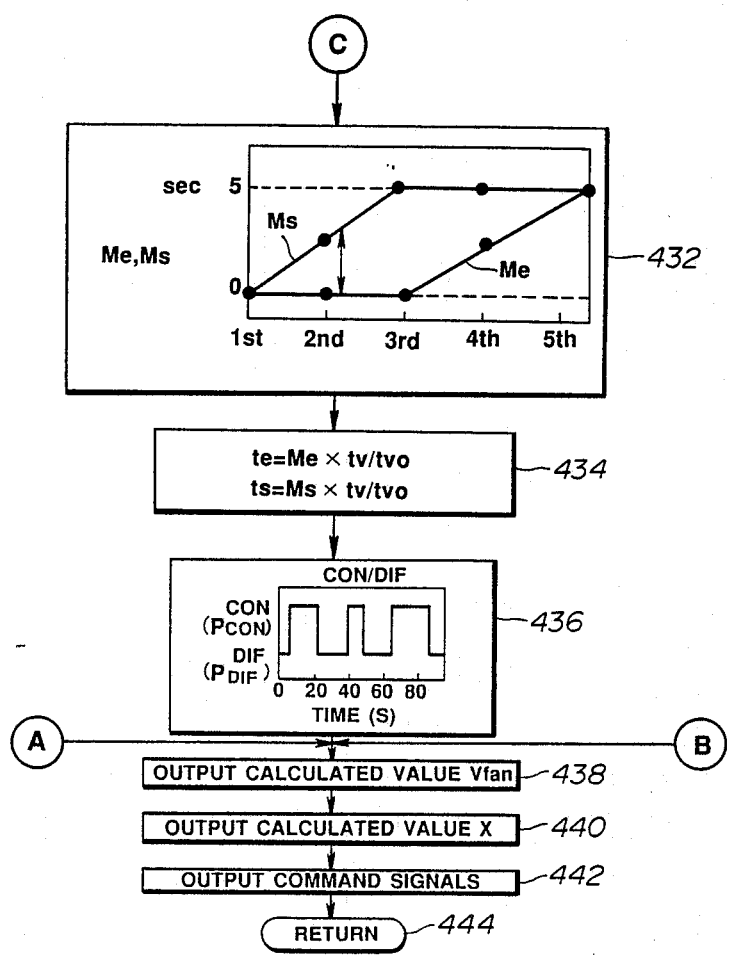

FIGS. 7A and 7B are flow diagrams of the programming of the digital computer used in a third embodiment of the control unit 41 for controlling the air conditioning system. The computer program is entered at the point 402 when the air conditioning system is powered. At the point 404 in the program, the central processing unit sets various constants A to H for use in calculating a required value Tof for tempered air temperatuer and a required value X for air mixing valve position. In addition, the central processing unit sets a reference time tvo required for the drive motor 8 to move the louver members 5 between the first position concentrating the tempered air discharged into the passenger compartment and the second position diffusing the tempered air dishcarged into the passenger compartment. At the point 406 in the program, an actual time tv it takes the drive motor 8 to move the louver members 5 between the first and second positions is measured. This measurement is made by monitoring drops in the current to the drive motor 8. Following this, the program proceeds to the point 408 where the ambient temperature signal, the compartment temperature signal, the insolation intensity signal, and the compartment temperature setting signal are, one by one, converted by the analog-to-digital converter into digital form and read into the computer memory. In addition, the desired current strength value Vt set by means of the discharged current strength setting device 46 is read into the computer memory. The setting device 46 may have first, second, third, fourth and fifth positions. A greater discharged current strength value Vt is set when the passenger selects a position having a higher ordinal number.

At the point 410 in the program, the central processing unit calculates a required value Vfan for blower motor driving voltage from a relationship programed into the computer. This relationship, shown in the block 410, defines blower motor driving voltage as a function of a difference (Tic−Tset) where Tic is the read compartment temperature value, and Test is the read compartment temperature setting value.

At the point 412 in the program, the central processing unit calculates a required value Tof for tempered air temperature from the following equation:

$$Tof = A \cdot Ta + B \cdot Tic + C \cdot Tset + D \cdot S + E$$

where Ta is the read ambient temperature value, Tic is the read compartment temperature value, Tset is the read compartment temperature setting value, S is the read insolation intensity value, and A, B, C, D and E are the constants set at the point 404. At the point 414 in the program, the central processing unit calculates a required value X for air mixing door position from the following equation:

$$X = F^2 \cdot Tof + G \cdot Tof + H$$

where Tof is the calculated tempered air temperature value, and F, G and H are the constants set at the point 404.

At the point 416 in the program, the central processing unit selects one of "heater", "bilevel" and "vent" modes. This selection is made based on the calculated value Tof of tempered air temperature, as shown in the block 416. At the point 418 in the program, a determination is made as to whether or not the "vent" mode is selected. If the answer to this question is "yes", then the program proceeds to the point 420. Otherwise, the program proceeds to the point 438.

At the point 420 in the program, a determination is made as to whether or not the compartment temperature exceeds a first reference value. For this determination, the central processing unit may compare the read compartment temperature value Tic hysteretically with a lower reference level (for example, 29° C.) when the compartment temperature is decreasing and with a higher reference level (for example, 30° C.) when the compartment temperature is increasing. This is effective to eliminate the tendency toward hunting. If the answer to this question is "yes", then it means that the read compartment temperature value Tic is greater than the lower reference level when the compartment temperature is decreasing or the read compartment temperature value Tic is greater than the higher reference level when the compartment temperature is increasing and the program proceeds to the point 426. Otherwise, the program proceeds to another determination step at the point 422. This determination is as to whether or not the insolation intensity S exceeds a second reference level. For this determination, the central processing unit may compare the read insolation intensity value S hysteretically with a lower reference level (for example, 120 kcal/m²h) when the insolation intensity is decreasing and with a higher reference level (for example, 300 kcal/m²h) when the insolation intensity is increasing. This is effective to eliminate the tendency toward hunting. If the answer to this question is "yes", then it means that the read insolation intensity value S is greater than the lower reference level when the insolation intensity is decreasing or the read insolation intensity value S is greater than the higher reference level when the insolation intensity is increasing and the program proceeds to the point 426. Otherwise, the program proceeds to another determination step at the point 424. This determination is as to whether or not the compartment temperature Tic exceeds a third reference level less than the first reference level. For this determination, the central processing unit may compare the read compartment temperature value Tic hysteretically with a lower reference level (for example, 26° C.) when the compartment temperature is decreasing and with a higher reference level (for example, 27° C.) when the compartment temperature is decreasing. This is effective to eliminate the tendency toward hunting. If the answer to this question is "yes", then it means that the read compartment temperature value Tic is greater than the lower reference level when the compartment temperature is decreasing or the read compartment temperature value Tic is greater than the higher reference level when the compartment temperature is increasing and the program proceeds to the point 430. Otherwise, the program proceeds to the point 428.

At the point 426 in the program, the central processing unit selects the "concentration" mode and produces a command signal to operate the drive motor 8 so as to place the louver members 5 at the first position discharging the tempered air in the form of concentrated current toward the respective passengers. Following this, the program proceeds to the point 438.

At the point 428 in the program, the central processing unit selects the "diffusion" mode and produces a command signal to operate the drive motor 8 so as to place the louver members 5 at the second position discharging the tempered air in the form of diffused currents toward the respective passengers. Following this, the program proceeds to the point 438.

At the point 430 in the program, the central processing unit selects the "concentration/diffusion" mode where the "concentration" and "diffusion" modes are changed alternatively. Following this, the program proceeds to the point 432.

At the point 432 in the program, the central processing unit calculates a diffusing position ($P_{DIF}$) in the form of time Me it takes the drive motor 8 to bring the louver members 5 to the diffusing position from the second position at which the air conditioning system operates in the "diffusion" mode and also a concentrating position ($P_{CON}$) in the form of time Ms it takes the drive motor 8 to bring the louver members 5 to the concentrating position from the second position. These calculations are made from relationships defining these times Me and Ms as a function of the desired current strength Vt; that is, the selected position of the discharged current strength setting device 46. As shown in the block 432, the time Me is set at zero when one of the first, second and third positions is selected, at 2.5 seconds when the fourth position is selected, and at 5 seconds when the fifth position is selected, whereas the time Ms is set at zero when the first position is selected, at 2.5 seconds when the second position is selected, and at 5 seconds when one of the third, fourth and fifth position is selected.

At the point 434 in the program, the central processing unit corrects the calculated times Me and Ms to obtain corrected times te and ts by multiplying the calculated times Me and Ms by a ratio tv/tvo where the tv is the time measured at the point 406 and tvo is the reference time set at the point 404. The corrected time te is the actual time required for the drive motor 8 to bring the louver members 5 from the second position to the diffusing position and the corrected time ts is the actual time required for the drive motor 8 to bring the louver members 5 from the second position to the concentrating position.

At the point 436 in the program, the central processing unit produces a command signal to operate the driver motor 8 to change the "concentration" and "diffusion" modes alternatively. In this case, the drive motor 8 is operated to hold the louver members 5 at the concentrating position ($P_{CON}$) during the "concentration" mode and to hold the louver member 5 at the diffusing position ($P_{DIF}$) during the "diffusing" mode.

At the point 438 in the program, the calculated blower motor driving voltage value Vfan is transferred to the digital-to-analog converter. The digital-to-analog converter converts the transferred information into analog form and applies a blower motor driving voltage for controlling the blower motor 27 according to the calculated value for it. At the point 440 in the program, the calculated air mixing value position value X is transferred to the digital-to-analog converter. The digital-to-analog converter converts the transferred information into analog form and applies a control signal to the air mixing value actuator 32 which thereby makes a change in the position of the air mixing valve 33 if this is required.

At the point 442 in the program, the central processing unit causes the control circuits to produce command signals to the valve actuators 37 and 39, causing the vent and change-over valves 38 and 40 to open the defroster port 35 and the lower port 36 when the "heater" mode has been selected at the point 416, or to open the ventilator port 34 and the lower port 36 when the "bilevel" mode has been selected at the point 416, or to open the ventilator port 34 when the "vent" mode has been selected at the point 416.

Following this, the program proceeds to the point 444 where the computer program returns to the point 408 to start the next cycle of execution of the computer program.

Although the discharged current strength setting device 46 has been described as having five positions, it is to be appreciated that the number of the positions of the setting device 46 is not limited in any way to five. The setting device 46 has only two positions, the first position indicating a passenger's demand for a greater discharged current strength and the second position indicating a passenger's demand for a smaller discharged current strength. In this case, the control may be made based on the number of operations of the discharged current setting device 46. In addition, the control may be made with a greater weight given to the latest operation of the setting device 46.

What is claimed is:

1. An air conditioning system for use with an automotive vehicle including a duct through which tempered air is directed into a compartment for passengers, the system comprising:

a control device associated with the duct for operating in a first mode discharging the tempered air in the form of concentrated currents toward the respective passengers, in a second mode discharging the tempered air in the form of diffused currents toward the respective passengers, and in a third mode changing the first and second modes alternatively to continue the first mode for a first period of time and the second mode for a second period of time;

means sensitive to a temperature in the passenger compartment for producing a first sensor signal indicative of a sensed value of compartment temperature;

means sensitive to an insolation intensity for producing a second sensor signal indicative of a sensed value of insolation intensity; and a control unit responsive to the first and second sensor signals for operating the control device in one of the first, second and third modes, the control unit including means for increasing a ratio of the first time period to the second time period with increasing insolation intensity during the third mode.

2. The air conditioning system as claimed in claim 1, wherein the control unit includes means for operating the control device in the third mode when the sensed compartment temperature is less than a reference value and when the sensed insolation intensity exceeds a reference value.

3. The air conditioning system as claimed in claim 1, wherein the control unit includes means for increasing the first time period while decreasing the second time period with increasing insolation intensity during the third mode.

4. The air conditioning system as claimed in claim 3, wherein the control unit includes means for reducing the first time period to zero when the insolation intensity is less than a predetermined value.

5. The air conditioning system as claimed in claim 3, wherein the control unit includes means for selecting a first random number at random from a number of random numbers, means for multiplying the first period by the selected first random number to modify the first period, means for selecting a second random number at random from the random numbers, and means for multiplying the second period by the selected second random number to modify the second period.

6. The air conditioning system as claimed in claim 5, wherein the random numbers range from 0.5 to 1.5.

7. The air conditioning system as claimed in claim 1, further comprising means for manually setting a desired strength of the currents discharged toward the respective passengers to produce a setting signal indicative of a desired current strength set therefor, and wherein control unit includes means responsive to the setting signal for increasing the first time period while decreasing the second time period with increasing desired current strength.

8. The air conditioning system as claimed in claim 7, wherein the first time period is reduced to zero when the first time period is less than a predetermined value, and means for reducing the second time period to zero when the second time period is less than the predetermined value.

9. An air conditioning system for use with an automotive vehicle including a duct through which tempered air is directed into a compartment for passengers, the system comprising:
   a control device associated with the duct for discharging the tempered air toward the respective passengers, the control device being operable in a first mode discharging the tempered air in the form of currents concentrated in a maximum degree, in a second mode discharging the tempered air in the form of currents diffused in a maximum degree, and in a third mode changing fourth and fifth modes alternatively, the control device discharging the tempered air in the form of currents concentrated in a first degree during the fourth mode and in the form of currents diffused in a second degree during the fifth mode;
   means sensitive to a temperature in the passenger compartment for producing a first sensor signal indicative of a sensed value of compartment temperature;
   means sensitive to an insolation intensity for producing a second sensor signal indicative of a sensed value of insolation intensity; and
   a control unit responsive to the first and second sensor signals for operating the control device in one of the first, second and third modes, the control unit including means for increasing the first degree while decreasing the second degree with increasing insolation intensity during the third mode.

10. The air conditioning system as claimed in claim 9, wherein the control unit includes means for operating the control device in the third mode when the sensed compartment temperature is less than a reference value and when the sensed insolation intensity exceeds a reference value.

11. The air conditioning system as claimed in claim 9, wherein the control unit includes means for setting the first degree at a predetermined minimum degree and the second degree at the maximum degree when the insolation intensity is less than a first predetermined value, and means for setting the first degree at the maximum degree and the second degree at a predetermined minimum degree when the insolation intensity is greater than a second predetermined value greater than the first predetermined value.

12. An air conditioning system for use with an automotive vehicle including a duct through which tempered air is directed into a compartment for passengers, the system comprising:
   a control device associated with the duct for discharging the tempered air toward the respective passengers, the control device being operable in a first mode discharging the tempered air in the form of currents concentrated in a maximum degree, in a second mode discharging the tempered air in the form of currents diffused in a maximum degree, and in a third mode changing fourth and fifth modes alternatively, the control device discharging the tempered air in the form of currents concentrated in a first degree during the fourth mode and in the form of currents diffused in a second degree during the fifth mode;
   means sensitive to a temperature in the passenger compartment for producing a first sensor signal indicative of a sensed value of compartment temperature;
   means sensitive to an insolation intensity for producing a second sensor signal indicative of a sensed value of insolation intensity;
   means for manually setting a desired strength of the currents discharged toward the respective passengers to produce a setting signal indicative of a desired current strength set therefor; and
   a control unit responsive to the first and second sensor signals for operating the control device in one of the first, second and third modes, the control unit including means responsive to the setting signal for increasing the first degree while decreasing the second degree with increasing desired current strength during the third mode.

13. The air conditioning system as claimed in claim 12, wherein the control unit incudes means for operating the control device in the third mode when the sensed compartment temperature is less than a reference value and when the sensed insolation intensity exceeds a reference value.

* * * * *